Figure 1:
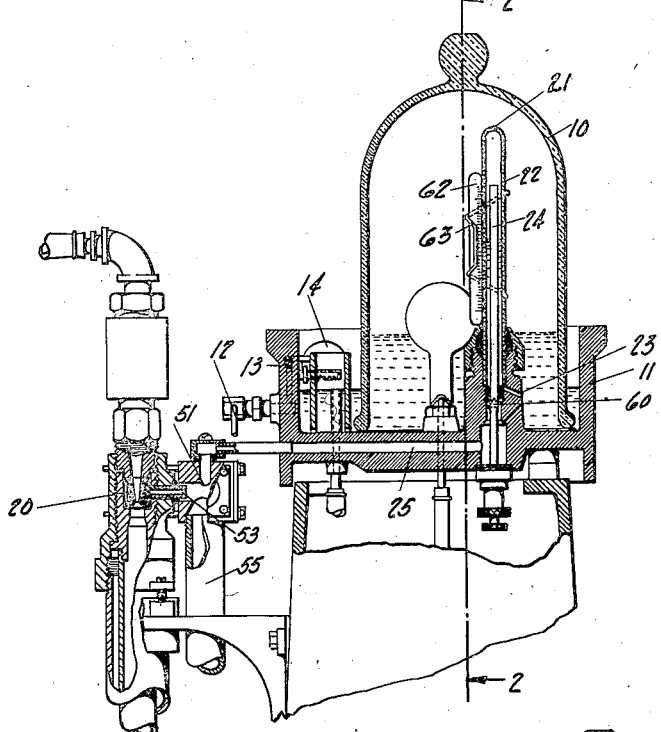

Aug. 22, 1933.  C. F. WALLACE  1,924,076

FLOW METER

Original Filed Nov. 30, 1927

INVENTOR
Charles F. Wallace
BY Arthur L. Kurt
his ATTORNEY

Patented Aug. 22, 1933

1,924,076

UNITED STATES PATENT OFFICE 1,924,076

FLOW METER

Charles F. Wallace, Westfield, N. J., assignor to Wallace & Tiernan Company, Inc., Belleville, N. J., a Corporation of New York Original Application November 30, 1927, Serial No. 236,851. Divided and this application June 3, 1930. Serial No. 459,030

5 Claims. (Cl. 73—167)

This invention relates to flow meters for measuring the rate of flow of gases. More particularly, the invention has to do with means for providing a scale for reading the height of a column of water or other liquid in the water-column tube of an orifice flow meter.

In flow meters of the kind comprising a water-column tube closed at its upper end except for a flow-controlling inlet orifice and a suction orifice, and in which, by suction through the suction orifice, a sub-atmospheric pressure is maintained within the tube, causing water to be raised within the tube from a constant level body of water into which the lower open end of the tube extends, and a scale for reading the height of the water column within the tube, which is the measure of the pressure reduction within the tube and of the flow through the flow-controlling orifice into the tube and thence on through the suction outlet, the flow-controlling orifice is usually not calibrated to an exact predetermined size, so that the same standard scale cannot be used for all meter tubes of a particular class or size, but it is necessary to provide for each tube a scale having the scale markings spaced according to the size of the flow-controlling orifice as determined by trial. It is thus desirable to be able to use scale strips which may readily be individually marked, such as strips of paper or other suitable material which will readily take and hold the scale markings. In certain uses of such meters, however, scales of this kind cannot be used because of their being exposed to substances which will attack and destroy a scale. I have especially in mind the use of such meters in apparatus in which the meter tube is mounted within a chamber containing chlorine gas.

The construction of my present invention avoids the necessity of using on a meter tube exposed to gaseous chlorine or other corrosive substances scale markings resistant to the chlorine or other substance by providing a sealed tube which is secured against the outside of the water-column tube of the flow meter, and containing a strip of paper or other suitable material on which the scale is marked. The scale within this sealed tube is thus clearly visible adjacent to the water-column tube. In some cases, the height of the water-column tube must be measured with relation to a point or level such as the surface of a body of water which may be changed at times by an adjustment of the apparatus, so that it becomes desirable to adjust the scale longitudinally of the water-column tube in order to have the zero point of the scale always at the level from which measurement is to be made. Therefore, I attach the sealed scale tube to the water-column tube by means of a suitable clip device so that it shall be adjustable as required lengthwise of the water-column tube, rather than securing it permanently and immovably to the water-column tube.

Figure 2:
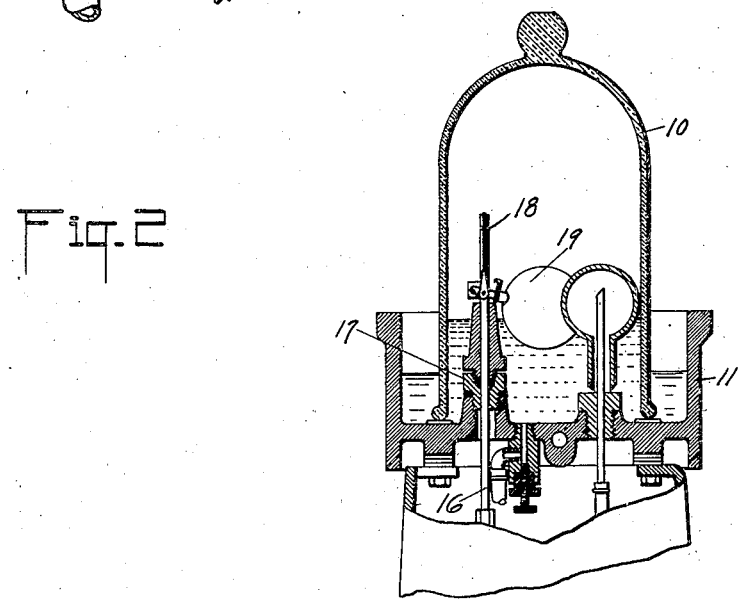

In the accompanying drawing, I have illustrated an embodiment of my invention forming part of a chlorine supply apparatus which forms the subject matter of my co-pending application Serial No. 236,851, filed November 30th, 1927 (Patent No. 1,777,986, dated October 7th, 1930), of which this present application is a division. In said drawing:

Fig. 1 is a sectional view of the upper part of the gas supply apparatus shown in my said application; and Fig. 2 is a sectional view taken on line 2—2 of Fig. 1.

The apparatus shown in the drawing is a chlorine flow-control apparatus by which chlorine gas taken from a tank of compressed liquefied chlorine, or other supply under pressure, is first reduced to a constant substantially atmospheric pressure and is then drawn through a flow-controlling orifice which forms part of a flow meter by the suction of a water aspirator by which the gas is mixed with and taken into solution in a minor flow of water, the solution thus produced to be then continuously fed into flowing water to be treated.

Referring to the drawing, 10 represents a bell jar which stands open end down in a tray 11 and provides a chlorine supply chamber in which, when the apparatus is in operation, a supply of chlorine gas is maintained at substantially atmospheric pressure, most desirably, and as indicated by the drawing, at a slightly negative pressure. Water is supplied to the tray 11 through a pipe 12 and is maintained at a constant level in the tray by means of a valve 13 controlled by a ball float 14, and the bell jar is supported so as to permit passage of water into the jar beneath its lower edge. Chlorine gas is supplied to the chamber within the bell jar from the source of supply under pressure through a tube 16 which leads upward through the bottom of the tray 11 and through a stuffing box 17 to a point above the maximum water level in the bell jar. The supply of chlorine to the chamber is controlled by means of a valve 18 adapted to seat at the upper end of the tube 16 and operated by a ball float 19. Chlorine gas is drawn from the supply chamber by means of a water aspirator 20 which draws the gas through a flow-controlling orifice 21 formed in the top of a flow meter tube 22 which extends upward within the bell jar from the bottom of the tray. A port 23 connects from below the water level in the supply chamber to the bottom of the tube 22, and a tube 24 connects to a passage 25 leading to the aspirator and extends upward within the tube 22 with its open upper end above the maximum level to which the water rises in the tube 22 under the suction head established therein by the aspirator 20.

By the action of the aspirator 20, chlorine gas is drawn from the supply chamber through the flow-controlling orifice 21. This tends to reduce the pressure within the supply chamber, causing the water level within the chamber to rise; but the float moving with change in water level within the chamber controls the supply of chlorine gas to the chamber so as to maintain the rate at which the chlorine enters the chamber equal to the rate at which it is withdrawn through the orifice 21. There is thus maintained within the chamber the desired constant gas pressure and a substantially constant water level corresponding to the gas pressure. The apparatus as shown operates with a slight negative pressure maintained in the chamber and with the water level thus somewhat above the constant level maintained in the tray 11. The parts connected with the tray and bell jar are or may be constructed as more particularly described in my co-pending application Serial No. 236,851.

The aspirator 20 is formed by a small Venturi tube, and a constant suction head is in the apparatus shown maintained on the suction side of the aspirator by means of a water-column tube 55 extending downward from a suction chamber 51 to which the passage 25 is connected and from which a suction passage 53 leads to the throat of the aspirator, as more particularly described in my said application. The constant suction head thus maintained on the suction side of the aspirator tends to draw chlorine gas from the supply chamber through the orifice 21. In order to provide for adjusting the rate of supply of the gas, a valve 60 is provided at the lower end of the tube 24. This chlorine rate-of-flow valve according to its adjustment determines the suction head transmitted to the orifice 21, thus determining the rate of the flow of chlorine from the supply chamber to the aspirator. Water will rise within the meter tube 22 to a height corresponding to the degree of vacuum, or suction head, therein, and the water elevation in the meter tube above the water level in the chamber 10 will indicate the drop in pressure across the orifice 21, so that, the meter tube being provided with a proper scale according to the size of the orifice, the height of the column of water in the tube will indicate the rate of flow of the chlorine gas, either directly, if the tube is provided with a rate-of-flow scale, or indirectly, if the tube is provided with a scale marked to show the negative pressure, or suction head.

According to the present invention, the meter scale is provided by means of a sealed tube 62 which is held against the meter tube 22, as by means of a spring clip 63, and which contains a strip of paper or other suitable material on which a scale is marked. An easily readable scale not affected by chlorine within the chamber is thus conveniently and cheaply provided, and the scale is readily adjustable to bring its zero mark to the water level to be maintained within the chamber. The scale should be so adjusted, since the rate of flow of chlorine from the chamber depends upon the difference in pressure across the orifice, and this difference in pressure is measured by the height of the column of water within the tube 22 above the level of water within the chamber 10.

Obviously, the invention is not limited to the particular means shown for adjustably and removably attaching the scale tube to the meter tube, or to attachment means providing for such adjustment or removal.

What is claimed is:

1. A flow meter for measuring the rate of flow of gas, comprising a water-column tube, a sealed tube attached to the water-column tube and containing a scale for reading the height of the water column within the water column tube, and means for attaching the sealed tube to the water column tube formed to permit the sealed tube to be adjusted longitudinally relatively to the water-column tube.

2. A flow meter for measuring the rate of flow of gas, comprising a water-column tube, a sealed tube attached to the water-column tube and containing a scale for reading the height of the water column within the water column tube, and means for removably attaching the sealed tube to the water column tube formed to permit the sealed tube to be adjusted longitudinally relatively to the water-column tube.

3. A flow meter for measuring the rate of flow of gas, comprising a water-column tube having a flow-controlling gas inlet orifice and a gas outlet opening from the gas space above the water in the tube, and a sealed tube attached to the water-column tube at one side thereof and parallel thereto and containing a scale for reading the height of the water column within the water-column tube.

4. A flow meter for measuring the rate of flow of gas, comprising a water-column tube having a water inlet at its lower end and having a flow-controlling gas inlet orifice and a suction outlet opening from the gas space above the water in the tube, and a sealed tube attached to the water-column tube at one side thereof and parallel thereto and containing a strip marked with a scale for reading the height of the water column in the water-column tube.

5. The combination with a gas chamber, means for supplying gas to said chamber, and means for controlling the supply of gas to the chamber to maintain a constant pressure therein, of a flow meter comprising a water-column tube having a water inlet at its lower end and extending upward within the gas chamber and connecting with the chamber through a flow-controlling orifice and having a suction outlet opening from the gas spaced above the water in the tube, and a sealed tube removably attached to the water-column tube at one side thereof and parallel thereto and containing a scale for reading the height of the water column in the water-column tube.

CHARLES F. WALLACE.